Aug. 16, 1932.                E. P. BONE                 1,872,643
                         LIGHT REFLECTING DEVICE
                     Filed May 17, 1930      2 Sheets-Sheet 1
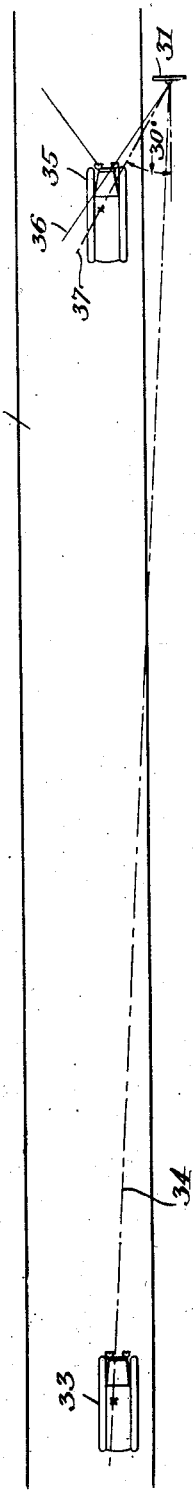
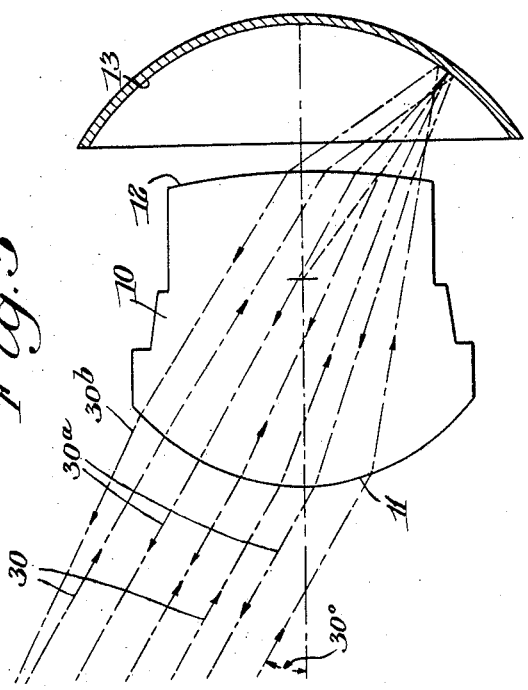
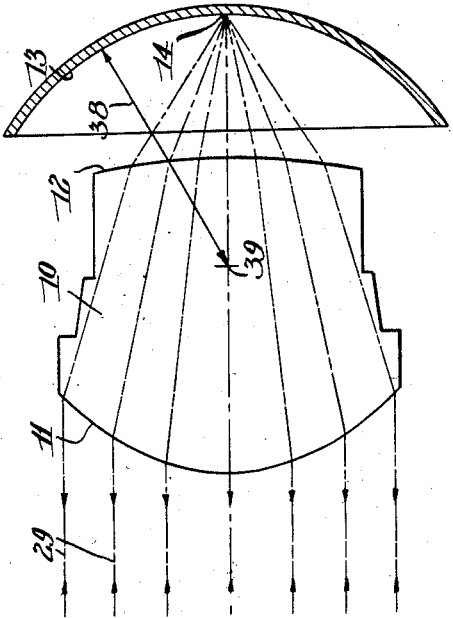
INVENTOR
Evan P. Bone
BY
his ATTORNEY Aug. 16, 1932.   E. P. BONE   1,872,643
LIGHT REFLECTING DEVICE
Filed May 17, 1930   2 Sheets-Sheet 2

INVENTOR
Evan P. Bone
BY Edward H. Cumpston
his ATTORNEY

Patented Aug. 16, 1932

1,872,643

UNITED STATES PATENT OFFICE

EVAN P. BONE, OF CINCINNATI, OHIO, ASSIGNOR TO THE NATIONAL COLORTYPE COMPANY, OF BELLEVUE, KENTUCKY, A CORPORATION OF KENTUCKY

LIGHT REFLECTING DEVICE

Application filed May 17, 1930. Serial No. 453,378.

This invention relates to light reflecting devices of the character adapted to reflect incident light in such a manner as to appear to be original sources of light, so as to be readily visible at a distance, especially at night, such devices being useful as and in connection with signs, signals, and the like, employed, for example, for directing and regulating traffic, advertising, and similar purposes.

One object of the invention is the provision of a device of the above character embodying novel optical properties by which a maximum quantity of incident light is utilized and reflected back to its source in such a manner as to afford maximum illumination and visibility.

Another object is to provide such a device constructed and arranged to produce reflection back to its source of light incident substantially parallel with the optical axis, with the least diffusion or spread, and highest intensity as required for visibility from more distant points of view, and to return light incident at greater angles to the axis, with increased spread as desired for visibility through a wide angular range of closer points of view.

Another object is to afford a device of the nature described of relatively short length along the optical axis corresponding to a high angular range of reflection, with provision for correction of the spherical aberration of light incident substantially parallel with the axis, to effect concentrated reflection thereof back to the light source.

A further object is to make use in such a device of one or more aspherical lens faces for controlling reflection to produce intensity of illumination in a desired direction.

A still further object is to supply such features in conjunction with a construction and arrangement of parts of a simple and practical nature, capable of being readily manufactured at a comparatively low cost.

To these and other ends the invention resides in certain improvements and combinations of parts, all as will be hereinafter more fully described, the novel features being pointed out in the claims at the end of the specification.

In the drawings:

Fig. 1 is a schematic view illustrating the application of the invention to a highway sign;

Fig. 2 is a diagrammatic view of a reflecting device embodying the invention and showing the reflection of rays incident substantially parallel with the optical axis;

Fig. 3 is a similar view but showing the reflection of rays incident at a substantial angle to the axis;

Similar reference numerals throughout the several views indicate the same parts.

Figure 4:
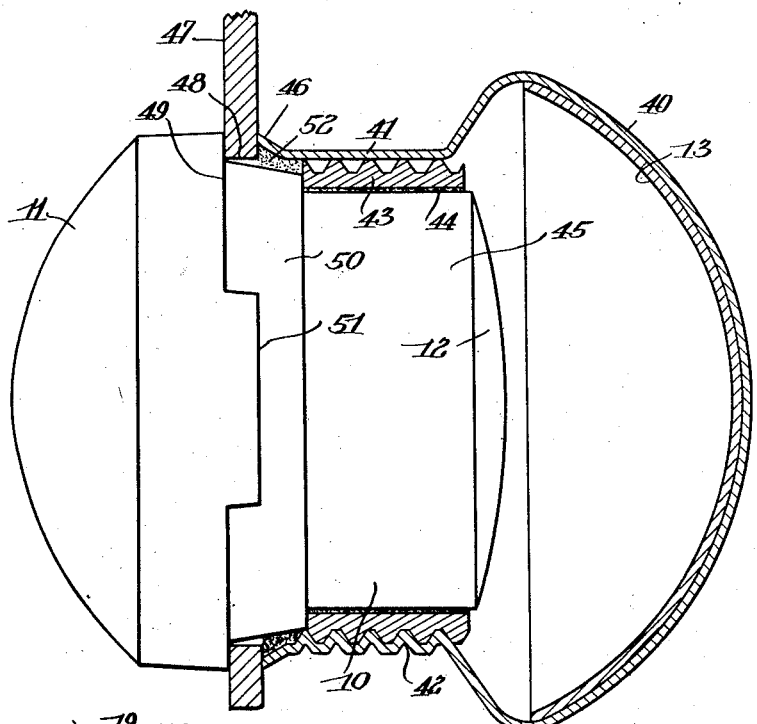
Fig. 4 shows an actual construction embodying the invention.

The invention is disclosed herein, in an illustrative way, as applied in conjunction with directional or warning signs for regulating highway traffic. The greater and increasing use of automobiles, driven at increasing rates of speed has produced an alarming increase in the hazards of travel, with an annual toll of tens of thousands of lives, besides a large number of lesser injuries and large property loss. To relieve this situation, the Federal, State and subordinate Government organizations have been actively seeking ways and means for better control of traffic, as a matter of urgent public concern. Highway signs have been extensively installed at a large aggregate expenditure of funds, but these, being mostly visible by day alone, have been of little or no use at night.

The problem of providing effective highway signs is further complicated by the fact that, in addition to the congestion of traffic and the speed of automobiles, their head lights are purposely designed to concentrate the beam on the roadway, with only an indirect and limited quantity of light avaiable at the sides of the road by which signs may be made visible. More recently efforts have been made to develop specularly reflective devices or "buttons" used to trace out the letters of signs and capable of being rendered luminous and visible by the limited light which the head lights throw at the road sides. Such devices have been made comprising a spherical lens face combined with a specular reflector, intended to reflect the rays from the headlights back to the driver of the car, but these devices have been lacking in sufficient illumination to be visible at adequate distances for rapidly moving vehicles, or else lacking in angular range, or in other respects, so that they have not solved the problem presented in an effective or satisfactory way.

It has been found in connection with the present invention that as an automobile approaches such light reflecting devices in a sign by the side of the road, and while at substantial distances therefrom, of say one or two hundred feet, more or less, it is located approximately in line with the optical axis of such devices. As the car approaches the sign, the line between them makes a progressively increasing angle with the optical axis, until the sign is eventually passed, as illustrated in Fig. 1 and referred to more specifically hereafter. In other words, the more distant points of view in the majority of cases, are substantially along the line of the optical axis, while nearer points of view are at increasing angles with the optical axis. For the more distant points, concentrated reflection of light is required for the intense illumination necessary to afford visibility. This follows from the greater distance to be covered from the headlight to the reflecting device and back, as well as the smaller appearance of the sign at a distance. At the same time, high visibility at a distance is of extreme importance because of the speed at which cars travel. Furthermore the greater time required to traverse the greater distances, through which the sign may be made visible, affords a longer opportunity to observe the sign than the lesser period spent in approaching the sign at close range. At the lesser distances less concentration and illumination are necessary, which permits of greater diffusion or spread of the rays in keeping with the increased angular range desired. It has been found that these desirable results may be obtained through the selection and adaptation of certain optical principles and arrangements, and more particularly through the use of lens and reflecting means so shaped, proportioned, and arranged as to accomplish the different types of reflection required for the different distances and directions as pointed out above.

The present conception comprises a highly efficient, specular reflecting device having the greatest illumination and least spread for the greater distances, and less luminosity but increased spread for the shorter distances. Such wide angular range of reflection or spread is best obtained by employing a combined lens means and reflector in which the diameter of the reflector is relatively large in comparison with the length of the device and the focal length of the lens. In a device so proportioned, however, the convexity of the lens surface tends to become so sharp that spherical aberration results to a serious degree. The reflected rays thus become scattered, so that the illumination becomes diffused and of low intensity, with the result that the device is not sufficiently illuminated to be readily visible, particularly at a distance, even along the optical axis.

It has been found, however, that the advantages of a unit of relatively short length may be utilized without its defects by employing a specially formed lens having one or more aspherical surfaces of such a nature as to correct the spherical aberration, utilize the whole surface of the lens front, and accomplish concentration of the rays and high luminosity and visibility for points, for example, along the optical axis but at considerable distances from the device. By this means the necessary intensity of illumination and visibility may be obtained for distant points of view, combined with a comparatively wide range of angularity for nearer points of view.

The preferred embodiment of the invention comprises a lens body 10 (Fig. 2) of suitable glass with an index of refraction of say, 1.523, having a front face 11, and a rear face 12, one or both of which may be generally convex. Preferably the front face 11 is of convex curvature, and the rear face 12 may be plano or convex. If convex it may be suitably shaped and silvered to serve as the reflector, but it is preferred, for reasons hereafter explained to provide a concave reflector 13 spaced in rear of the convex rear face 12 of the lens, and concentric with the optical axis of the lens. The use of a bi-convex lens, as shown, is advantageous for the reason that it shortens the focal length and the length of the device as a whole, the reflector 13 being placed with its vertex at the focal point 14 of the axially parallel rays, as shown.

In any such construction of the lens and reflector, at least one face of the lens is formed with an aspherical curvature which is sharper adjacent the optical center than adjacent the periphery. This aspherical curvature is a surface of revolution generated by revolving upon its axis, a curve preferably approximating that known in the science of geometry as a Cartesian oval. In case the reflector is located on the rear face 12 of the lens, without any air gap, this generated curve is substantially a Cartesian oval. When the reflector is spaced from the lens, however, a modified generating curve is employed departing from the Cartesian oval sufficiently to compensate for the effect upon the path of the light rays of the curvature of the rear face 12 of the lens. By the use of an aspherical surface of the character described, spherical aberration or scattering of the light rays may be completely eliminated, at least in the region of the optical axis. Such construction makes possible the sharp focusing, reflection and efficient utilization of substantially all of the light incident on the lens parallel with its axis. The departure from a spherical surface, while substantial from an optical aspect and highly effective, is, of course, scarcely to be observed on the drawings without exaggeration.

Figure 5:
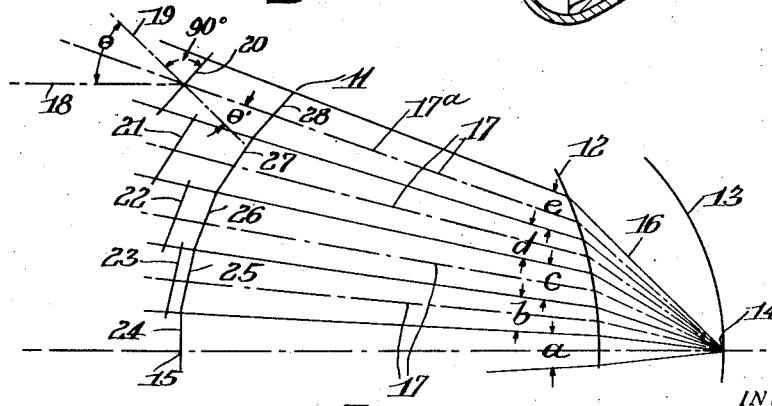
Fig. 5 is a diagrammatic view illustrating one method of forming an aspherical lens face in accordance with the invention.

One practical method for constructing such an aspherical surface, which has been found highly effective in use, is shown by way of illustration in Fig. 5 of the drawings, in which the aspherical front face of the lens is indicated generally at 11. At 12 is the rear spherical face of the lens, in rear of which is spaced the coaxially arranged reflector 13. The radius of the spherical rear face 12 is arbitrarily selected as conditions may indicate. The focal point 14 is located on the optical axis at such a point that the ratio of the diameter of the active portion of the reflector, to the optical length of the system, corresponds to the range of angularity through which the device is intended to function. The shorter the unit, that is, the farther forward the focal point 14 is placed in the unit the greater is the extreme angle at which incident light is reflected back to its source. This point may be selected more or less arbitrarily for a preliminary trial and then moved toward or from the lens to increase or decrease the extreme angle of reflection, as may be found desirable. Similarly the apex 15 of the front aspherical face is selected in accordance with the general characteristics and proportions desired for the device.

Having thus selected the curve 12 of the rear lens face, and the location on the axis of the focus 14 and of the apex 15 of the front aspherical face, a series of rays of light are traced from the focal point 14 toward the lens at progressively increasing angles with the optical axis, as shown at 16, so that, as refracted by the rear face 12 of the lens, they form the zones "$a$", "$b$", "$c$", "$d$" and "$e$", so proportioned as to intercept substantially equal segments on the front face 11. The central or chief rays of each of the said zones are drawn, as shown, by the broken lines 17. Each of the central rays 17 is to be refracted by the aspherical front face 11 into a direction parallel with the optical axis. The direction of curvature of the front face 11 for so refracting each ray 17 is readily determined from the well known equation $$\frac{\sin \theta}{\sin \theta'} = u,$$

as well understood in the art. For example, in the case of the extreme central ray $17a$, a line 18 is drawn parallel with the optical axis and intersecting this ray at any convenient point, as shown. From the above equation, with the known value of the index of refraction "$u$", the angles $\theta$ and $\theta'$ are obtained to locate the line 19 passing through the intersection of lines $17a$ and 18. Through this intersection, perpendicular to the line 19, is then drawn a line 20 which gives the inclination of the desired curve at the intersection therewith of the central ray $17a$.

In the same manner, lines 21, 22, 23, and 24 for the remaining zones are obtained, the last being drawn through the apex 15 of the required surface. At the intersection of line 24 with the margin of the zone "$a$", a line or segment 25 is then drawn parallel to the line 23. In the same way segments 26, 27, and 28 are obtained parallel, respectively, to lines 22, 21, and 20. Through these segments 24 to 28 inclusive, a smooth curve is drawn to afford the desired generating curve sufficiently accurately for all practical purposes.

By revolving this curve about the optical axis, the desired aspherical face of the lens is obtained, such that rays of light incident upon the lens parallel with the optical axis are accurately focused at the point 14 substantially without aberration. A lens is thus provided having a face formed to correct spherical aberration of rays incident parallel with the axis, to afford maximum concentration of such rays, and therefore, maximum intensity of illumination for points substantially on the line of the optical axis. The spherical aberration in rays incident along lines at substantial angles to the optical axis, is less and less affected by the correction as the angularity with the optical axis increases, corresponding to less illumination but greater spread at the greater angularities. This increasing spread of the rays at wide angularities consistently accommodates the increasing angle included between lines from the reflecting unit to the automobile headlight and the driver's eyes, as the latter approaches the reflecting unit where less luminosity is required, as more particularly pointed out hereafter.

Fig. 2 of the drawings shows the concentrated reflection of rays 29, incident in a direction substantially parallel with the optical axis back along the path of incidence, to the light source, which is the approximate condition obtaining when the automobile headlight illuminates the unit from a distance and maximum luminosity is required. Fig. 3 shows rays 30 incident at a substantial angle to the optical axis, for example 30°, which rays are reflected back along the path of incidence toward the light source as at $30a$, and also more or less diffused and scattered by aberration and imperfect focusing of the rays on the reflector, as shown, one of the rays, as 30b, being drawn to indicate this spread or scattering of the light, as found useful to include the increased angular separation of the driver's eyes from the headlight at the greater angularities usually associated with closer points of view.

The above described operation of the device is illustrated diagrammatically in Fig. 1, where 31 represents a sign in which the reflecting device is mounted adjacent the side of a roadway 32. At 33 is an automobile approaching the sign from a distance, of, say, two hundred or two hundred fifty feet. As indicated by the line 34, the driver views the reflected device substantially at right angles to its face, or in other words, along the line of the optical axis, which includes substantially both the driver's eyes and the headlights, so that the very slight diffusion resulting from the unavoidable inaccuracies of manufacturing methods is sufficient to carry to the driver's eyes a beam of reflected light of maximum concentration, and hence of maximum intensity of illumination and visibility. This is the condition substantially as illustrated in Fig. 2.

The changed condition as the automobile nears the reflecting device is indicated at 35, where the lines 36 and 37 include the substantial angle which has developed between rays incident from the headlight on the device, and those reflected by the latter to the driver's eyes. This is the position, however, of maximum diffusion or spread of the rays from the device, for accommodating such increased angular divergence, accompanied by the decreased luminosity which is, however, sufficient for the lesser distance. This is the condition substantially as illustrated in Fig. 3.

The reflector 13, as stated above, has its apex located at the focal point 14 on the optical axis, and may be given any suitable curvature, being shown in the present instance as spherical. It is preferably constructed with a radius such as to bring its curvature generally perpendicular to the maximum number of central rays of the useful cones of light incident upon the device at the various effective angles, or, more precisely, generally tangent to their perpendiculars at the points of intersection therewith. This radius may be readily found by plotting the useful cones from a light source located at various positions within the effective angular range, and selecting such a radius for the reflector as will serve to reflect the central rays of such cones back along their paths of incidence. It is obvious, however, that the useful spread in rays incident at the wider angles may be slightly increased by slightly increasing or decreasing the reflector radius so found, by moving its center of curvature slightly forward or backward along the optical axis, and such increased spread or diffusion may, of course, be accomplished by other expedients well understood in the art and in such amount as particular conditions or the choice of the designer may indicate. The radius of the reflector is indicated in the present instance at 38, Fig. 2, having a center at 39. It will be noted that the reflector is of comparatively large diameter with relation to the diameter of the lens and the length of the device along the optical axis, as desired for wide angular range.

In addition to the intense illumination along the optical axis and the high degree of visibility thereby obtained for distant points of view, as well as the wide angular range of effectiveness of the device, its construction is such also as to include a maximum diameter or area for the front face, for collecting the maximum quantity of incident light. This result is made possible by the effective proportioning of the several parts, and by an advantageous arrangement for mounting the device. This is best illustrated by reference to Fig. 4, showing an actual commercial construction. The lens is shown at 10 and the reflector at 13. The reflector is fixed in any suitable manner in the bottom of a correspondingly curved metal cup, or cap, 40, having a reduced cylindrical neck portion 41 provided at spaced points about its circumference with threaded portions 42. The latter are engaged with a threaded sleeve 43 secured in any suitable manner, as by means of cement 44, on the reduced rear end 45 of the lens. It will be seen from this construction that the cap 40, carrying within it the silvered brass reflector 13, is adjustably screwed on the rear end of the lens, with a flared front end 46 adapted for clamping engagement with the rear surface of a mounting plate 47.

The support or mounting plate 47 is apertured at 48 for the insertion of the rear end of the lens therethrough from the front side of the plate. The front face of the lens is formed at its rear with an annular shoulder 49 adapted to be seated, as shown, on the front face of plate 47 and secured in such position by the clamping engagement of the cap 40 with the rear side of the plate. The lens is formed with an intermediate shoulder or mounting portion 50 of the reduced diameter except at the portion 51 which is left projecting to form a radial shoulder or key for engagement with a correspondingly shaped keyway cut in the edge of the plate aperture 48, to lock the lens against rotation in the mounting plate and thus prevent unauthorized removal of the lens by turning it from the front of the plate to release it from its cap. Support 47 may be the front wall of a closed housing, the sides and rear of which protect the cap from access. The mouth of the cap is preferably filled about the lens shoulder 50 with cement 52 to hermetically seal the interior of the cap and thus prevent tarnishing of the silvered reflector.

It will be understood in conjunction with the above description of the construction shown in Fig. 4 that such reflecting devices are commonly employed to trace out letters on a sign, and that the limiting factor as to the diameter of the device is the diameter of the mounting aperture in the sign, since adjacent apertures must be substantially spaced to leave a substantial width of metal therebetween. The provision of lens means having a relatively large front face larger than and overlapping the mounting aperture, and a rear face of less diameter, inserted from the front through said aperture, provides for the maximum utilization of light rays in a mounting aperture of maximum diameter. In other words, the described construction as shown in Figures 2, 3, and 4, enables the use of a lens front face of maximum effective diameter adapted to transmit all of the light which can be refracted and passed in a converging beam through the available mounting aperture and reflected back therethrough. This high light collecting capacity, combined with the high utilization of the large quantity of light collected, affords an intensity of luminosity not heretofore attained.

The preferred use of a bi-convex type of lens serves to converge the rays to a focus within a relatively short optical axis. At the same time, the application of the reflector from the rear of the mounting plate permits of the use of a reflector of relatively large diameter, larger than that of the rear face of the lens and its mounting portion. These features conjointly produce a wide angular range of effective reflection.

The invention thus provides a reflecting unit efficiently constructed and arranged to produce the greatest luminosity and least spread for the longer distances, with lesser luminosity and greater spread for the shorter distances. It thus effectively compensates, on the one hand, for the lesser light available over the longer distances, as well as the smaller apparent size of the sign at such distances, and, on the other, for the increased angular variation between the headlights and the driver's eyes corresponding to the shorter distances at which, moreover, the lesser luminosity is sufficient. It thus affords distant visibility with sufficient range for the observance of a warning sign and reduction in speed of travel, with sufficient luminosity for continued visibility through a wide angle at lessened speed in the proximity of the sign.

While the invention has been disclosed in this instance with reference to its adaptability for use in highway signs, it may be adapted as well by the application of the same principles to various other uses, which, with various modifications in details of structure and arrangement, will readily occur to those skilled in the art.

I claim:

1. A light reflecting device comprising lens means, and reflecting means in rear of said lens means, said lens means having a face thereof aspherically curved to provide correction for spherical aberration in rays incident in a direction substantially parallel with the lens axis and retaining spherical aberration in rays incident in a direction at a substantial angle with said axis, whereby said rays incident substantially parallel with said axis are reflected back in the direction of the light source with low spread and high intensity and said rays incident at a substantial angle with said axis are reflected with a higher spread and lower intensity.

2. A light reflecting device comprising lens means, and reflecting means in rear of said lens means, said lens means having the front face thereof on which the light is incident aspherically curved to provide correction for spherical aberration in rays incident in a direction substantially parallel with the lens axis and retaining spherical aberration in rays incident in a direction at a substantial angle with said axis, whereby said rays incident substantially parallel with said axis are reflected back in the direction of the light source with low spread and high intensity and said rays incident at a substantial angle with said axis are reflected with a higher spread and lower intensity.

3. A light reflecting device comprising lens means, and curved reflecting means in rear of and spaced from said lens means, said lens means having a face thereof aspherically curved to provide correction for spherical aberration in rays incident in a direction substantially parallel with the lens axis and retaining spherical aberration in rays incident in a direction at a substantial angle with said axis, whereby said rays incident substantially parallel with said axis are reflected back in the direction of the light source with low spread and high intensity and said rays incident at a substantial angle with said axis are reflected with a higher spread and lower intensity.

4. A light reflecting device comprising a biconvex lens, and a curved reflector in rear of and spaced from said lens, said lens having a face thereof aspherically curved to provide correction for spherical aberration in rays incident in a direction substantially parallel with the lens axis and retaining spherical aberration in rays incident in a direction at a substantial angle with said axis, whereby said rays incident substantially parallel with said axis are reflected back in the direction of the light source with low spread and high intensity and said rays incident at a substantial angle with said axis are reflected with a higher spread and lower intensity.

5. A light reflecting device comprising lens means, and reflecting means in rear of said lens means, said lens means having a face thereof aspherically curved with sharper curvature adjacent the central than the peripheral portions thereof to provide correction for spherical aberration in rays incident in a direction substantially parallel with the lens axis and retaining spherical aberration in rays incident in a directin at a substantial angle with said axis, whereby said rays incident substantially parallel with said axis are reflected back in the direction of the light source with low spread and high intensity and said rays incident at a substantial angle with said axis are reflected with a higher spread and lower intensity.

6. A light reflecting device comprising lens means, and reflecting means in rear of said lens means, said lens means having a face thereof aspherically curved to approximate the shape of a Cartesian oval to provide correction for spherical aberration in rays incident in a direction substantially parallel with the lens axis and retaining spherical aberration in rays incident in a direction at a substantial angle with said axis, whereby said rays incident substantially parallel with said axis are reflected back in the direction of the light source with low spread and high intensity and said rays incident at a substantial angle with said axis are reflected with a higher spread and lower intensity.

7. A light reflecting device comprising a single biconvex lens, and curved reflecting means in rear of and spaced from said lens, said lens having a face thereof aspherically curved with sharper curvature adjacent its central than adjacent its marginal portions to provide correction for spherical aberration in rays incident in a direction substantially parallel with the lens axis for reflecting said rays back in the direction of the light source with low spread and high intensity.

8. A sign provided with reflecting devices each comprising a single lens and a reflector in rear thereof, said lens having a relatively short focal length and having a face thereof aspherically curved to provide correction for spherical aberration in rays incident in a direction substantially parallel with the lens axis for reflecting said rays back in the direction of the light source with low spread and high intensity.

9. A sign provided with reflecting devices each comprising a single lens and a curved reflector in rear of and spaced from said lens, said lens having a relatively short focal length and having a face thereof aspherically curved with sharper curvature adjacent its central than adjacent its peripheral portions to provide correction for spherical aberration in rays incident in a direction substantially parallel with the lens axis for reflecting said rays with low spread and high intensity back in the direction of the light source.

10. A sign provided with reflecting devices each comprising a single biconvex lens of relatively short focal length, and a curved reflector in rear of and spaced from said lens, said lens having a face thereof aspherically curved with sharper curvature adjacent its central than adjacent its peripheral portions to provide correction for spherical aberration in rays incident in a direction substantially parallel with the lens axis for reflecting said rays with low spread and high intensity back in the direction of the light source.

EVAN P. BONE.